United States Patent [19]

Gallant et al.

[11] Patent Number: 5,102,440

[45] Date of Patent: Apr. 7, 1992

[54] GRANULAR SLOW RELEASE FERTILIZER COMPOSITION AND PROCESS

[75] Inventors: William E. Gallant; Harvey M. Goertz, both of Marysville; Richard Martinez, Columbus, all of Ohio

[73] Assignee: The O. M. Scott & Sons Company, Marysville, Ohio

[21] Appl. No.: 503,238

[22] Filed: Apr. 2, 1990

[51] Int. Cl.$^5$ .............................................. C05C 9/02
[52] U.S. Cl. .......................................... 71/28; 71/29; 71/30; 71/64.06; 71/64.07; 71/64.08; 71/64.13
[58] Field of Search ................................. 71/28–30, 71/64.07, 64.08, 64.13, 64.06

[56] References Cited

U.S. PATENT DOCUMENTS

| | | | |
|---|---|---|---|
| 3,219,432 | 11/1965 | Schafer et al. | 71/28 |
| 3,220,824 | 11/1965 | Church | 71/28 |
| 3,248,255 | 4/1966 | Belasco et al. | 71/28 X |
| 4,025,329 | 5/1977 | Goertz | 71/29 X |
| 4,055,974 | 11/1977 | Jackson, Jr. | 71/28 X |
| 4,280,830 | 7/1991 | Ferguson et al. | 71/28 X |

*Primary Examiner*—Ferris Lander
*Attorney, Agent, or Firm*—Jones, Day, Reavis & Pogue

[57] ABSTRACT

A carrierless granular slow release fertilizer composition is prepared by spraying a urea-formaldehyde resin composition having a U/F molar ratio ranging from 2.4 to 13.3 onto finely divided solid particulate raw materials and cooling the resulting sprayed product to solidify the resin composition providing a matrix within which the solid particulate raw materials are bound. The fertilizer composition is characterized by having desired physical and chemical properties in regard to chain length of nitrogen polymers in the product, nitrogen release patterns, hardness and dust free nature of the product and the dispersibility characteristics of the product. The product has an abrasion index of about 0.800–1.000.

17 Claims, No Drawings

GRANULAR SLOW RELEASE FERTILIZER COMPOSITION AND PROCESS

BACKGROUND OF THE INVENTION

This invention relates to a process for the production of a carrierless granular slow release fertilizer composition and to the resulting product.

A variety of processes for producing carrierless granular slow release fertilizer compositions are known and, particularly, processes for producing controlled or slow release reaction products of urea and formaldehyde for fertilizer applications. For example, such carrierless products have been produced by reacting a urea-formaldehyde resin into a solid sheet which is milled and screened to provide a granular product having a desired particle size. A typical U/F mole ratio used for producing the product is in the range of 1.1 to 2.1 and the resulting product contains predominantly long chain methylene urea polymers (i.e., tetramethylene pentaurea (TMPU) and longer chain polymers). Such products and processes are disclosed, for example, in U.S. Pat. No. 3,198,761.

Other known processes for producing carrierless granular slow release fertilizer products are disclosed, for example, in U.S. Pat. Nos. 3,076,700; 3,705,794 and 3,989,470. Essentially, these carrierless products are produced by reacting urea-formaldehyde resins into rigid foams which are dried, milled and screened to the desired granular size. Typical U/F mole ratios used for these processes range from 1.3 to 2.4 and; as opposed to the technology disclosed in U.S. Pat. No. 3,198,761 which is suitable solely for production of nitrogen only products, the processes disclosed in these patents have the flexibility of producing complex fertilizers by slurrying other finely ground additives such as phosphorus and/or potassium salts into the resin prior to the foaming reaction. The products produced by these processes contain predominantly intermediate chain length methylene urea polymers (i.e., trimethylene tetraurea (TMTU) and longer chain polymers).

U.S. Pat. No. 4,025,329 discloses another process for producing a carrierless product. In this process a granular product is formed, for example, in accordance with the disclosures in U.S. Pat. Nos. 3,705,794 and 3,989,470 and then the granules are compacted with other nutrient or pesticide additives to produce a product of uniform composition and particle size. U/F mole ratios employed to produce this slow release product are in a range of 1.3 to 2.4, the density of the granule produced is greater than 1.4 and the granular size is greater then 30 mesh, with substantially all of the granules having a ratio of largest to smallest granule of less than 3:1.

U.S. Pat. Nos. 4,378,238 and 4,411,683 disclose, inter alia, a process for producing carrierless slow release granular products having at least 60% of the polymeric nitrogen in the form of methylene diurea (MDU) and dimethylene triurea (DMTU). The process disclosed therein for producing carrierless product is a two stage process wherein an aqueous mixture of urea, formaldehyde and ammonia is first reacted at elevated temperatures to produce methylol ureas. Then, in a second stage, acid is added directly to the reaction mixture and the acidified mixture is reacted and the condensation reaction product is dried and milled into the final product. Typical U/F mole ratios for these carrierless products range from 1.9 to 2.2.

A further experimental process for producing urea-form fertilizer products is disclosed in an article entitled "Reactions of Molten Urea with Formaldehyde", by Thomas P. Murray et. al., published in *Ind. Eng. Chem. Prod. Res. Dev.*, 1985, at 420–425. The process disclosed therein entails the reaction of molten urea with paraformaldehyde either by mixing paraformaldehyde into melted urea at temperatures of between 130 degrees and 140 degrees C. or by premixing the paraformaldehyde with the urea and heating the solid mixture to 130 degrees C. with stirring. Thereafter, the molten reaction mixture resulting from either of the procedures is cooled to form a solid sheet and the sheet is then ground. U/F mole ratios used under the laboratory-scale conditions described in the publication ranged from 0.5 to 16.2.

However, each of the previously known processes for producing carrierless granular slow release fertilizer products has been found to have certain shortcomings in terms of the physical or chemical characteristics of the products produced thereby and/or the economics of production. For example, the process disclosed in U.S. Pat. No. 3,198,761 is restricted to nitrogen only fertilizers. Furthermore, products produced by this process have been found to demonstrate nitrogen release patterns which are not well suited to certain applications such as turf and short season crops. Similarly, the products resulting from use of the experimental process disclosed in the above referenced article are restricted solely to nitrogen only fertilizer compositions.

The processes disclosed in U.S. Pat. Nos. 3,076,700; 3,705,794 and 3,989,470 represent an advancement in respect to their ability to produce a wide variety of N-P-K minor element ratios in the products and are not restricted to the production of nitrogen only products. However, even these processes are restricted in the range of N-P-K ratios in view of the limit on the amount of solids which can be slurried into the urea-formaldehyde resin without adversely impacting the condensation reaction. Furthermore, the products produced in accordance with the disclosure of U.S. Pat. Nos. 3,076,700; 3,705,974 and 3,989,470 have been found to be quite fragile and dusty.

The process of patent 4,025,329 produces high density granular products of uniform granular size. The process also enables the incorporation of other fertilizer ingredients into the product and provides flexibility as to the N-P-K minor element ratios which can be produced. However, the product does present a dust plume problem resulting from surface adhesion of dust to the product during the manufacturing process when the product is poured from its storage container. Furthermore, the products produced present the same performance problems as noted above in regard to the processes disclosed in U.S. Pat. Nos. 3,076,700; 3,705,794 and 3,989,740. Additionally, these high density products have been found to present a dispersibility problem in regard to their use on turf. In this regard, these products do not disperse adequately to penetrate the turf canopy after application. Thus, the product remains on the surface to be picked up on shoes, golf balls and the like as they travel over the turf.

In regard to the process disclosed in U.S. Pat. Nos. 4,378,238 and 4,411,683 as it relates to carrierless products, it has been found that the process therein cannot be economically or feasibly conducted to produce commercially acceptable carrierless products. Carrierless products as referred to herein are intended to include products which do not employ an absorbent carrier capable of absorbing liquids to provide a granular structure to the final product. That is in carrier based systems, the volume of the product is quite close to the sum of the volumes of the raw materials. This is because the carrier creates the volume structure upon which the product is formed. Thus, the product to feed volume ratio (P/F) for absorbent carrier based fertilizers is essentially 1. Experimental determinations have shown a range of 0.9 to 1.1. Typical examples of commonly used carriers which are not required for use in forming products of the present invention are vermiculite, perlite and corncobs.

Accordingly, none of the prior processes are suitable for producing carrierless granular slow release fertilizer compositions having the desired characteristics either because of process or product shortcomings such as the cost effectiveness of the process, the ability to include additive products in the urea-formaldehyde reaction product and the physical properties of the product. In terms of physical properties, the prior art products have exhibited undesirable characteristics regarding dusting and dispersibility.

SUMMARY OF THE INVENTION

It is a primary object of the present invention to provide a cost effective process for producing carrierless slow release nitrogen containing fertilizer products in granular form.

Another object is to provide a process for producing carrierless slow release nitrogen containing fertilizer products which is readily adaptable for the inclusion of a wide variety of additive ingredients including plant nutrients, pesticides such as herbicides, insecticides, fungicides and the like in any desired concentration or amount without negatively impacting the physical and chemical properties of the products.

A further object is to provide a carrierless slow release nitrogen containing fertilizer product having desired physical and chemical properties, for example, in regard to chain length of nitrogen polymers in the product, nitrogen release patterns provided in use of the products, hardness and dust free nature of the product and the dispersibility characteristics of the product.

A more specific object of this invention is to provide a process for producing a slow release granular methylene urea fertilizer product without a carrier from small particulate raw materials bound together within a urea-formaldehyde resin matrix formed from a molten urea-formaldehyde resin having a U/F ratio in the range of about 2.4 to 13.3 and to the product produced thereby.

The foregoing and other objects of this invention are achieved by a process which comprises preparing a mixture of urea and formaldehyde, the molar ratio of urea to formaldehyde ranging from 2.4 to 13.3, heating the reaction mixture until essentially all of the formaldehyde in the mixture is fully reacted and a molten or liquid urea-formaldehyde resin is formed. Then, the molten urea-formaldehyde resin is sprayed on small finely divided solid raw material particles and the urea-formaldehyde resin acts as a binder to agglomerate the solid particles within a matrix formed by the urea-formaldehyde resin in order to produce a granular product of a desired size. The resulting product is allowed to cool and solidify into a hard granular carrierless product which exhibits slow release nitrogen properties. The final product has an abrasion index indicative of the granular material's ability to withstand mechanical processing (i.e., its resistance to attrition) in a range of about 0.850 to about 1.000 as determined by the following test procedure:

1. A 100 gram test sample of granular product was prescreened to a lower limit of 14 US mesh for $-6+14$ mesh granules or 25 US mesh for $-10+25$ mesh granules and was deposited on a clean limit screen;

2. Stainless steel balls (about thirty one $\frac{5}{8}$ inch diameter balls having a total weight of 500 grams) were added to the screen with the test sample;

3. The screen with the granular test sample and the stainless steel balls was introduced into a lidded Rotap sieve shaker (with hammer) having a collections pan positioned beneath the screen;

4. The Rotap assembly was operated for five (5) minutes; and, thereafter, the balls were removed from the screen and the final product on the limit screen was weighed; and 5. The abrasion index was calculated by determining the ratio of the final weights of product to its initial weight (i.e., 100 grams).

DETAILED DESCRIPTION

In the process of this invention a mixture of urea and formaldehyde is prepared having a molar ratio of urea to formaldehyde ranging from 2.4 to 13.3 depending on the desired methylene urea chain length and the level of slow release nitrogen desired in the final product. This reaction mixture is then heated to a temperature of from about 250 degrees F. to about 285 degrees F. and the heating of the mixture is continued for a period of time until essentially all of the formaldehyde in the mixture is fully reacted and a molten urea-formaldehyde resin is formed. Preferably, this heating is conducted over a period of time of about $\frac{1}{2}$ to about 2 hours and, most preferably, for a period of about 1 hour. Normally, during this heating operation, at least about 60% of the water in the mixture is evaporated out of the mixture; although, the moisture may be removed subsequent to the reaction by appropriate techniques, if desired.

The process of the present invention is intended to produce products which do not use carriers. Instead, small finely divided solid raw material particles are built up into a fertilizer granule by spraying the molten urea-formaldehyde resin resulting from the heating step onto these particles at a controlled rate and in a manner such that the particles are essentially "glued" together to form a final granular product. The size of the solid particles onto which the molten resin is sprayed is a critical factor in the production of the products of this invention. Specifically, particle sizes expressed in terms of Size Guide Numbers (SGN) in the range of about 40 to 90 have been found to be acceptable for use herein although an SGN range of about 45-65 is preferred. The term Size Guide Number (SGN) as employed herein is the calculated diameter of the "average particle" expressed in millimeters to the second decimal and then multiplied by 100. More precisely, SGN is that particle size which divides the mass of all particles in two equal halves, one having all the larger size particles and the other half having all smaller size particles.

The composition of the finely divided solid particles for use herein to produce the final granular product is essentially a matter of choice among a wide variety of solid raw materials including sources of primary, secondary and minor element plant nutrients, pesticides, adjuvants or other desirable additives such as fillers. Thus, the present process provides a virtually limitless potential for producing suitable granular products having a wide range of N-P-K ratios by incorporating phosphorus and/or potassium nutrients therein, for example, as particulate $P_2O_5$ or $K_2O$ or $K_2SO_4$ and, if desired, including a wide diversity of other plant nutrients, micronutrients, pesticides and other additives and adjuvants.

In the practice of the process of this invention, the molten urea-formaldehyde resin is sprayed on the finely divided solid particles in a suitable spray chamber such as a rotating drum or some other suitable agglomerator such as a fluid bed or pugmill. The rate of resin addition has been found to be important in the formation of the desired granules. For example, if the spray rate is too low, proper agglomeration will not be achieved. In this regard, it has been found that preferred rates for spraying the molten urea-formaldehyde resin on N-P-K particles (expressed in terms of weight percent resin/weight percent additives in the product) should be in a range of about 0.5–5.0. The temperature of the sprayed resin and of the ambient surroundings within the spray chamber during spraying have been found to be important in producing products having the desired physical properties. Specifically, the temperature of the resin must be cooled sufficiently after spraying to solidify in order to fuse or bond the finely divided particles within a matrix formed by the urea-formaldehyde resin. With regard to the temperature of the chamber, it must be maintained at a level such that the resin will be capable of cooling sufficiently to solidify without remaining in a liquid or molten state. Preferably, the temperature of the chamber should not exceed about 160 degrees F. since the particles sprayed with the resin have been found to become "sticky" or "gummy" at temperatures above 160 degrees F.

It should be noted that the process for producing the final granulated products herein is not pH dependent as is the case with many of the prior processes. Furthermore, it is of particular note that the products emerging from the spray chamber constitute the finished granular products of the present invention and no separate primary milling or crushing stage is required to produce the final granular product as has been standard practice in the production of essentially all prior products. This feature renders the present process more energy efficient in operation than prior systems and enables implementation thereof at lower capital expense than has been possible heretofore.

In the present process, after the granular product is removed from the spray chamber, it is cooled to further harden the granules as well as to accommodate the handling of the finished product. Then, the granules are screened to separate out "oversize" granules and "fines". The "oversize" granules are milled in a secondary milling operation to reduce the granule size and are rescreened. The "fines" or undersized granules are recycled directly back into the spray chamber or agglomerator for further granule build up. The resulting screened "on-size" granular nitrogen containing fertilizer products are ready for packaging and distribution. These granular products have been found to exhibit high physical integrity and hardness, to be of uniform granular size and to be homogeneous in chemical composition. Additionally, the products produced by this process were found to be dust free, to be easily dispersed when contacted with water and to require significantly less push effort when applied to turf in "drop spreaders" as compared with prior N-P-K fertilizers of similar granule size.

Furthermore, the U/F ratio of the urea-formaldehyde resin forming the matrix structure of the final product of the present invention dictates the methylene urea polymer distribution and the nitrogen release characteristics of the product. Thus, products produced in accordance with the present invention are slow release nitrogen products which include at least 15% of the total nitrogen therein as compounds possessing slow release properties such as methylene diurea (MDU) and are made with U/F ratios of up to about 13.3 in order to provide the required level of slow release nitrogen in the product. The lower limit of U/F ratios to be employed in the products of this invention has been found to be about 2.4 and, the preferred range of U/F ratios is from about 2.7 up to about 13.3. In this regard, it should be noted that the relatively low quantities of formaldehyde employed herein relative to the urea content results in a significant economic advantage compared with prior commercially available formulations.

The following examples are specific illustrations of the practice of the invention in accordance with the foregoing process. All parts and percentages are by weight unless otherwise indicated.

EXAMPLE 1

Finely divided particles of muriate of potash (KCl) and monoammonium phosphate (MAP) were metered at a rate of 189 lbs./hour KCl (2.7 cubic feet/hour) and 171 lbs./hour MAP (2.9 cubic feet/hour), as solids, into a drum granulator. The particle sizes of the solid KCl and MAP raw materials employed herein were as follows:

| RAW MATERIAL | U.S. SIEVE DISTRIBUTION ||||||||||| SIZE (SGN) |
|---|---|---|---|---|---|---|---|---|---|---|---|---|
| | 10 | 12 | 14 | 16 | 18 | 25 | 40 | 70 | 100 | 200 | −200 | |
| KCl | — | — | — | 0.5 | 5 | 20 | 37 | 24 | 9 | 4 | 0.5 | 49.5 |
| MAP | — | — | 0.2 | 2.4 | 5 | 12 | 25 | 33 | 16 | 5 | 1.4 | 47.4 |

Granulation of these particulate solids was accomplished by spraying the raw material particles on the moving bed of the rotating drum with a molten resin composition of urea and methylene ureas at a rate of 1639 lbs./hour (21.0 cubic feet/hour). The molten resin composition had a U/F mole ratio of 4.0 and was prepared by mixing prilled urea fed at a rate of 1488 lbs./hour and urea-formaldehyde concentrate fed at a rate of 327 lbs./hour in a stirred tank reactor and heating the mixture to a temperature of 275 degrees F. The urea-formaldehyde concentrate used was UFC-85, a precondensed solution of formaldehyde and urea containing substantial amounts of free formaldehyde and dimethylol ureas. The residence time in the reactor was one hour during which time the mixture was maintained at 275 degrees F. During this one hour period, the U/F condensation reaction was essentially completed with essentially all of the formaldehyde in the mixture being fully reacted and the water in the mixture (water of reaction and water from the UFC-85) was removed by evaporation resulting in the production of 1639 lbs./hour of molten resin composition consisting of urea and polymerized methylene ureas containing 3.8% water.

The molten resin was sprayed onto the raw material particles at a resin to solids ratio of 4.6 (feed rate resin/feed rate solid raw materials which is equivalent to the ratio of weight percent resin/weight percent raw materials) and the resulting agglomerated granules were then cooled and screened to a minus 10 plus 25 mesh size (U.S. Sieves). Oversize granules were milled and rescreened. Undersize granules or "fines" were returned to the drum granulator for additional agglomeration.

The resulting product had an abrasion index of 0.954 as determined by the procedure set forth hereinabove utilizing a 25 US mesh limit screen. Furthermore, the product had a bulk density of 42.0 lbs./cubic foot and was produced at a rate of 2000.0 lbs./hour (47.6 cubic feet/hour). The volume ratio of product to feed materials (P/F) for the product was 1.79. Furthermore, the final product had an average particle size expressed as a Size Guide Number (SGN) of 127.2 based on the following percentages of product retained on each sieve in a nest of sieves:

| U.S. SIEVE DISTRIBUTION | | | | | | | | | |
|---|---|---|---|---|---|---|---|---|---|
| +6 | 6/8 | 8/10 | 10/12 | 12/14 | 14/16 | 16/18 | 18/25 | 25/40 | 40/70 |
| — | — | 0.7 | 9 | 29 | 21 | 19 | 17 | 4 | 0.3 |

The product produced was a carrierless controlled release granular N-P-K fertilizer having a high resin to solids ratio with the following chemical analysis (in weight percent): Total N—36.0; Total $P_2O_5$—4.2; Total $K_2O$—5.7; Total $H_2O$—0.8 and the pH was 5.2. Also, the product has a fast release nitrogen content as a percent of total nitrogen of 54.8 including 54.0% Urea N and 0.8% ammoniacal N. The slow or controlled release nitrogen content as a percent of total nitrogen was 45.2.

EXAMPLE 2

A second product was produced in accordance with the process of Example 1 utilizing the same raw material particles fed at the same rates and resin composition sprayed at the same rate as in Example 1. However, the granular size of the products produced in this Example was enlarged by screening the granules (after they emerge from the drum granulator and have been cooled) to a minus 6 plus 14 mesh particle size (U.S. Sieves).

Analysis of the resulting product indicated chemical properties which were essentially the same as the product of Example 1 but the physical properties set forth in the following table show a substantially larger granular size (SGN—197.4) with approximately the same bulk density (42.6 lbs./cubic foot). The P/F volumetric ratio for this product was 1.78 and the abrasion index was 0.925, as determined by the procedure set forth hereinabove utilizing a 14 US mesh limit screen.

EXAMPLE 3

This Example illustrates the production of a slow release granular N-P-K product (31-3-12) produced with a relatively low resin to solids ratio without the use of an absorbent carrier.

Finely divided particles of muriate of potash (KCl) and monoammonium phosphate (MAP) (having the same particle size as set forth for the raw materials in Example 1) were metered at a rate of 421 lbs./hour KCl (6.0 cubic feet/hour) and 131 lbs./hour MAP (2.2 cubic feet/hour), as solids, into a drum granulator.

Granulation of these particulate solids was accomplished by spraying the raw material particles on the moving bed of the rotating drum with a molten resin composition of urea and methylene ureas at a rate of 1448.0 lbs./hour (18.6 cubic feet/hour). The molten resin composition had a mole ratio of 4.0 and was prepared by mixing prilled urea fed at a rate of 1315 lbs./hour and urea-formaldehyde concentrate (UFC-85) fed at a rate of 289 lbs./hour in a stirred tank reactor and heating the mixture to a temperature of 275 degrees F. The residence time in the reactor was one hour during which time the mixture was maintained at 275 degrees F. During this one hour period, the U/F condensation reaction was essentially completed with essentially all of the formaldehyde in the mixture being fully reacted and the water in the mixture (water of reaction and water from the UFC-85) was removed by evaporation resulting in the production of 1448.0 lbs./hour of molten resin composition consisting of urea and polymerized methylene ureas containing 3.8% water.

The molten resin was sprayed onto the raw material particles at a resin to solids ratio of 2.6 (feed rate resin/feed rate solid raw materials which is equivalent to the ratio of weight percent resin/weight percent raw materials) and the resulting agglomerated granules were then cooled and screened to a minus 10 plus 25 mesh size (U.S. Sieves). Oversize granules were milled and rescreened. Undersize granules or "fines" were returned to the drum granulator for additional agglomeration.

The resulting product had an abrasion index of 0.992 as determined by the procedure set for hereinabove utilizing a 25 US mesh limit screen. Furthermore, the product had a bulk density of 43.4 lbs./cubic foot and was produced at a rate of 2000.0 lbs./hour (46.1 cubic feet/hour). The volume ratio of product to feed materials (P/F) for the product was 1.72 and the final product had an average particle size expressed as a Size Guide Number (SGN) of 141.3 based on the following percentages of product retained on each sieve in a nest of sieves:

| U.S. SIEVE DISTRIBUTION | | | | | | | | | |
|---|---|---|---|---|---|---|---|---|---|
| +6 | 6/8 | 8/10 | 10/12 | 12/14 | 14/16 | 16/20 | 20/25 | 25/40 | 40/70 |
| — | 22 | 19 | 21 | 30 | 7 | 1 | — | — | — |

| | | | U.S. SIEVE DISTRIBUTION | | | | | | |
|---|---|---|---|---|---|---|---|---|---|
| +6 | 6/8 | 8/10 | 10/12 | 12/14 | 14/16 | 16/18 | 18/25 | 25/40 | 40/70 |
| — | — | 0.2 | 12 | 39 | 28 | 14 | 6 | 0.7 | 0.1 |

The product produced had the following chemical analysis (in weight percent): Total N—31.7; Total $P_2O_5$—3.2; Total $K_2O$—12.6; Total $H_2O$—0.9 and the pH was 5.4. Also, the product had a fast release nitrogen content as a percent of total nitrogen of 51.6 including 51.0% Urea N and 0.6% ammoniacal N. The slow or controlled release nitrogen content as a percent of total nitrogen was 48.4.

EXAMPLE 4

This Example illustrates the production of a slow release granular N-P-K product similar to the product produced in Example 3 except that particles of sulfate of potash ($K_2SO_4$) were substituted as the potassium source in the product and the urea-formaldehyde resin employed had a significantly lower U/F mole ratio (U/F-3.4).

Finely divided particles of sulfate of potash ($K_2SO_4$) and monoammonium phosphate (MAP) were metered at a rate of 433 lbs./hour $K_2SO_4$ (4.9 cubic feet/hour) and 135 lbs./hour MAP (2.2 cubic feet/hour), as solids, into a drum granulator. The particle sizes of the solid $K_2SO_4$ and MAP raw materials employed herein were as follows:

| RAW | | | U.S. SIEVE DISTRIBUTION | | | | | | | | SIZE |
|---|---|---|---|---|---|---|---|---|---|---|---|
| MATERIAL | 10 | 12 | 14 | 16 | 18 | 25 | 40 | 70 | 100 | 200 | −200 | (SGN) |
| $K_2SO_4$ | 0.4 | 2.0 | 11 | 14 | 16 | 20 | 18 | 10 | 5 | 2 | 1.6 | 88.8 |
| MAP | — | — | 0.2 | 2.4 | 5 | 12 | 25 | 33 | 16 | 5 | 1.4 | 47.4 |

Granulation of these particulate solids was accomplished by spraying the raw material particles on the moving bed of the rotating drum with a molten resin composition of urea and methylene ureas at a rate of 1432.0 lbs./hour (18.4 cubic feet/hour). The molten resin composition had a mole ratio of 3.4 and was prepared by mixing prilled urea fed at a rate of 1277 lbs./hour and urea-formaldehyde concentrate (UFC-85) fed at a rate of 333 lbs./hour in a stirred tank reactor and heating the mixture to a temperature of 275 degrees F. The residence time in the reactor was one hour during which time the mixture was maintained at 275 degrees F. During this one hour period, the U/F condensation reaction was essentially completed with essentially all of the formaldehyde in the mixture being fully reacted and the water in the mixture (water of reaction and water from the UFC-85) was removed by evaporation resulting in the production of 1432.0 lbs./hour of molten resin composition consisting of urea and polymerized methylene ureas containing 3.8% water.

The molten resin was sprayed onto the raw material particles at a resin to solids ratio of 2.5 (feed rate resin/feed rate solid raw materials which is equivalent to the ratio of weight percent resin/weight percent raw materials) and the resulting agglomerated granules were then cooled and screened to a minus 10 plus 25 mesh size (U.S. Sieves). Oversize granules were milled and rescreened. Undersize granules or "fines" were returned to the drum granulator for additional agglomeration.

The resulting product had an abrasion index of 0.981 as determined by the procedure set forth hereinabove utilizing a 25 US mesh limit screen Furthermore, the product had a bulk density of 42.9 lbs./cubic foot and was produced at a rate of 2000.0 lbs./hour (46.6 cubic feet/hour). The volume ratio of product to feed materials (P/F) for the product was 1.83. Furthermore, the final product had an average particle size expressed as a Size Guide Number (SGN) of 145.4 based on the following percentages of product retained on each sieve in a nest of sieves:

| | | | U.S. SIEVE DISTRIBUTION | | | | | | |
|---|---|---|---|---|---|---|---|---|---|
| +6 | 6/8 | 8/10 | 10/12 | 12/14 | 14/16 | 16/18 | 18/25 | 25/40 | 40/70 |
| — | — | 4 | 15 | 33 | 29 | 17 | 2 | — | — |

The product produced had the following chemical analysis (in weight percent): Total N—31.5; Total $P_2O_5$—3.3; Total $K_2SO_4$—10.5; Total $H_2O$—1.1 and the pH was 5.3. Also, the product had a fast release nitrogen content as a percent of total nitrogen of 46.6 including 46.0% Urea N and 0.6% ammoniacal N. The slow or controlled release nitrogen content as a percent of total nitrogen was 53.4.

EXAMPLE 5

An N-P-K product (16-0-30) was produced by metering finely divided solid particles of sulfate of potash ($K_2SO_4$) at a rate of 2511 lbs./hour $K_2SO_4$ (28.2 cubic feet/hour) into a drum granulator. The particle sizes of the solid $K_2SO_4$ raw material employed herein were the same as set forth in Example 4 having an SGN of 88.8.

Granulation of the particulates was accomplished by spraying the raw material particles on the moving bed of the rotating drum with a molten resin composition of urea and methylene ureas at a rate of 1489 lbs./hour (19.1 cubic feet/hour). The molten resin composition had a mole ratio of 4.0 and was prepared by mixing prilled urea fed at a rate of 1352 lbs./hour and urea-formaldehyde concentrate (UFC-85) fed at a rate of 297 lbs./hour in a stirred tank reactor and heating the mixture to a temperature of 275 degrees F. The residence time in the reactor was one hour during which time the mixture was maintained at 275 degrees F. During this one hour period, the U/F condensation reaction was essentially completed with essentially all of the formaldehyde in the mixture being fully reacted and the water in the mixture (water of reaction and water from the UFC-85) was removed by evaporation resulting in the production of 1489 lbs./hour of molten resin composition consisting of urea and polymerized methylene ureas containing 3.8% water.

The molten resin was sprayed onto the raw material particles at a resin to solids ratio of 0.6 (feed rate resin/feed rate solid raw materials which is equivalent to the ratio of weight percent resin/weight percent raw materials) and the resulting agglomerated granules were then cooled and screened to a minus 10 plus 25 mesh size (U.S. Sieves). Oversize granules were milled and rescreened. Undersize granules or "fines" were returned to the drum granulator for additional agglomeration.

The resulting product had an abrasion index of 0.860 as determined by the procedure set forth hereinabove utilizing a 25 mesh US limit screen. Furthermore, the product had a bulk density of 56.7 lbs./cubic foot and was produced at a rate of 4000.0 lbs./hour (70.5 cubic feet/hour). The volume ratio of product to feed materials (P/F) for the product was 1.49. Furthermore, the final product had an average particle size expressed as a Size Guide Number (SGN) of 107.3 based on the following percentages of product retained on each sieve in a nest of sieves:

| | | | U.S. SIEVE DISTRIBUTION | | | | | | |
|---|---|---|---|---|---|---|---|---|---|
| +6 | 6/8 | 8/10 | 10/12 | 12/14 | 14/16 | 16/18 | 18/25 | 25/40 | 40/70 |
| — | — | — | 2 | 15 | 18 | 20 | 34 | 11 | — |

The product produced had the following chemical analysis (in weight percent): Total N—16.0; Total $P_2O_5$—0; Total $K_2SO_4$—30.6; Total $H_2O$—0.4 and the pH was 8.0. Also, the product had a fast release nitrogen content as a percent of total nitrogen of 55.0 derived from Urea N. The slow or controlled release nitrogen content of the product as a percent of total nitrogen was 45.0.

EXAMPLE 6

Control samples were prepared of prior art compositions with UF ratios greater than 2.4 utilizing expanded vermiculite as an absorbent carrier to provide the granular structure of the final product. The presence of this absorbent carrier diluted the N-P-K analysis of the product. For example, a carrier based product with an N-P-K ratio similar to the product produced in Example 1 was found to have a 30.2-3.1-4.0 analysis because of the dilution of the absorbent carrier.

The control products used for analysis in this Example were produced by spraying 67.9% (by weight) of a urea/methylene urea resin (u/F=4.0) onto expanded vermiculite, and finely divided KCl and MAP at weight percents of 19.5%, 6.5%, and 6.1 respectively. The resin was absorbed into the porous vermiculite and simultaneously wet the surface of the carrier. The finely divided P and K salts adhered to the wetted surface. The final product had a bulk density of 25 lb/cu ft and an average particle size (SGN) of 118.0. Due to the presence of the absorbent carrier, the volume of the product was essentially equal to the volume of the raw materials (P/F volume ratio=0.9).

Additional products were prepared in order to determine the minimum amount of vermiculite carrier which could be used in producing the control products of this Example. These products were produced as described above except that the amount of expanded vermiculite was reduced to the point where it could no longer absorb the UF resin. This level was equal to 8.9 percent by weight of the raw materials. The resulting product had a 34.6-3.7-4.6 analysis Its bulk density was 34.0 lb/cu ft. The volumetric ratio of product to feed (P/F) was 1.1 demonstrating that with absorbent carrier based products, the volume of the product essentially equals the sum of the volumes of the raw materials.

EXAMPLE 7

This example illustrates the advantages of the products of the present invention in terms of dispersibility, dusting and product utilization as compared with prior carrierless products produced in accordance with the disclosure of U.S. Pat. No. 4,025,329. For purposes of the comparative testing, the products of Example 3 and 5 were employed as representative samples of the present invention.

In regard to dispersibility of the products, it should be noted that this is an important product feature in that it relates to the potential for a product to disperse down into the turf canopy after watering. This is especially important on dense turf such as putting greens. Failure to disperse leads to performance problems such as speckled greening response, particle pickup by shoes and equipment, and prolonged product visibility.

A laboratory test was devised to quantify dispersibility. The following procedure was employed:
1. Screen materials to a −12+16 mesh (U.S. Sieves) size to remove any effects of differing particle size.
2. Weigh 10.00 grams of sample into a 400 ml beaker.
3. Add 100 ml of distilled water.
4. Stir constantly on a magnetic stirrer for 3 minutes (speed #2 on a 6 speed unit).
5. Pour the beaker contents onto a 25 mesh sieve (U.S. Sieves). Rinse the beaker with 100 ml of distilled water.
6. Rinse the fertilizer on the sieve for 15 seconds with a low pressure water stream through a flaring nozzle.
7. Transfer the contents of the sieve to a preweighed sheet of brown paper. Sharp raps with the screen to a counter top sufficiently removes the fertilizer.
8. Place the paper in a drying oven (50°–70° C.) until dry.
9. Allow the paper to cool. Weigh the paper plus fertilizer and determine weight of remaining fertilizer.
10. Calculate the % dispersibility $$100 \times (10.00 - r)/10.00 = \% \text{ dispersibility}$$

where r=weight of remaining fertilizer.

In accordance with this test procedure, the dispersibilities were determined for the products of Examples 3 and 5 and for products of similar analysis (N-P-K) produced in accordance with the disclosure in U.S. Pat. No. 4,025,329. The results of this testing were as follows:

| Test Product | N-P-K | Dispersibility |
|---|---|---|
| Example 3 | 31-3-12 | 99.4% |

-continued

| Test Product | N-P-K | Dispersibility |
| --- | --- | --- |
| Prior Art | 31-3-10 | 96.8% |
| Example 5 | 16-0-30 | 95.9% |
| Prior Art | 16-0-30 | 74.8% |

From the forgoing tabulated test results, it can be seen that the products of this invention display superior dispersibility characteristics.

Another test was conducted to illustrate that products of this invention require less push effort and are better suited to "drop spreaders" than prior art products having similar analysis which are produced in accordance with the disclosure in U.S. Pat. No. 4,025,329.

To demonstrate this, all samples were screened to a specific sieve size (−12+16 mesh, U.S. Sieves) to eliminate particle size effects. The hopper of a laboratory model "drop spreader" (Scott Model PF-3) was filled with material, so that the agitator bar was covered. The spreader setting was set at "8". The push effort was determined by measuring the torque needed to turn the axle of the spreader with the flow control bar in the "closed" position. Results of this testing were as follows:

| Product | N-P-K | Push Effort-Torque (in-lb) |
| --- | --- | --- |
| Example 3 | 31-3-12 | 3-6 |
| Prior Art | 31-3-10 | 6-16 |
| Example 5 | 16-0-30 | 2-4 |
| Prior Art | 16-0-30 | 5-13 |

As shown, products of this invention were shown to require substantially less push effort to apply with a "drop spreader" than the comparative samples.

A further test was conducted to demonstrate that products of this invention do not have the inherent problems with dusting characteristics common to prior art samples of similar analysis.

Samples from Examples 3 and 5 and corresponding prior art samples produced in accordance with the disclosure in U.S. Pat. No. 4,025,329 were screened to a specific granular size (−12+16 mesh, U.S. Sieves) to remove any effects of small granules. Each screened material (300 grams) was then poured through a funnel with a ⅜ inch orifice at a rate of 10–16 grams per second and was collected in a 400 ml beaker positioned one foot below the funnel. Visual notation was made of any dust plume coming off the beaker and the results were tabulated as follows:

| Product | N-P-K | Dust Plume |
| --- | --- | --- |
| Example 3 | 31-3-12 | No |
| Prior Art | 31-3-10 | Yes |
| Example 5 | 16-0-30 | No |
| Prior Art | 16-0-30 | Yes |

Although all of the test samples were prescreened to remove fine granules, the prior art samples still generated a dust plume when poured from the bag. This is due to surface adhesion of dust during the manufacturing process. Products in accordance with the present invention had no surface dust adhering to them an consequently produced no dust plume.

The invention has been illustrated with specific examples of fertilizer compositions. Many other nutrients, as well as micronutrients, and control chemicals such as herbicides, fungicides and insecticides may be employed in the products produced by the process of the invention. Examples of other additives are shown in the aforementioned U.S. Pat. Nos. 3,076,700, 3,231,363 and 3,705,794. Other additives are likewise set forth in Farm Chemicals '90, Meister Publishing Company, 1990. Other pesticides which may be used are shown in the Pesticide Manual, 6th Edition, British Crop Protection Council, 1980. Other herbicides which may be used are shown in Weed Control, 2nd Edition, 1962, Robbins et al., McGraw-Hill Book Company, Inc., New York, N.Y. Other fertilizer nutrients which may be used in combination are shown in Commercial Fertilizers, 5th Edition, 1955, Collings, McGraw-Hill Book Inc., New York, N.Y.

We claim:

1. A process of preparing a carrierless solid granular slow release urea-formaldehyde fertilizer composition, the granules having an abrasion index of about 0.850 to about 1.000 comprising:

preparing a molten urea-formaldehyde resin composition by mixing urea and formaldehyde at a molar ratio of urea to formaldehyde ranging from 2.4 to 13.3 and heating the resulting mixture until essentially all of the formaldehyde in the mixture is fully reacted;

spraying said molten urea-formaldehyde resin composition onto finely divided solid particles and cooling said sprayed product to solidify said resin composition providing a matrix within which said solid particles are bound.

2. The process of claim 1 wherein said heating is at a temperature of about 250 degrees F. to about 285 degrees F.

3. The process of claim 2 wherein said heating is for a period of about ½ to about 2 hours.

4. The process of claim 1 wherein said spraying is performed at a rate of about 0.5 to about 5.0 (weight percent resin composition/weight percent finely divided solid particles).

5. The process of claim 1 wherein said solid particles have a particle size in the rang of about 40–90 SGN.

6. The process of claim 1 wherein said solid particles are selected form the group consisting of primary, secondary and minor element plant nutrients, micronutrients, pesticides and mixtures thereof.

7. The process of claim 1 wherein said heating is for a period sufficient to evaporate at least 60% of the water in the mixture.

8. The process of claim 1 wherein said molten urea-formaldehyde resin composition is sprayed onto said particles in a spray chamber having an ambient temperature within the spray chamber such that the resin will cool sufficiently to solidify.

9. The process of claim 8 wherein said temperature in said spray chamber is less than about 160 degrees F.

10. The process of claim 8 wherein said spray chamber is a rotating drum.

11. A carrierless granular slow release methylene urea fertilizer composition consisting essentially of hard granules of said methylene urea having an abrasion index of about 0.85 to about 1.000;

each of said granules containing finely divided solid particulate materials essentially in the absence of an inert carrier;

said granules being formed by spraying an essentially fully reacted molten urea-formaldehyde resin composition having a molar ratio of urea to formaldehyde of 2.4 to 13.3 on said particulate materials and cooling the resulting sprayed product to solidify the resin composition providing a matrix within which said solid particles are bound.

12. The fertilizer composition of claim 11 wherein said essentially fully reacted, molten urea-formaldehyde resin composition is formed by preparing a reaction mixture of urea and formaldehyde, the molar ration of urea to formaldehyde ranging from 2.4 to 13.3 and heating said reaction mixture until essentially all of the formaldehyde in the mixture is fully reacted and said molten composition is formed.

13. The fertilizer composition of claim 12 wherein said reaction mixture is heated at a temperature of from about 250 degrees F. to about 285 degrees F.

14. The fertilizer composition of claim 12 wherein said mixture is heated for a period of about ½ hour to about 2 hours.

15. The fertilizer composition of claim 11 wherein said particulate materials have a particle size in the range of about 40–90 SGN.

16. The fertilizer composition of claim 11 wherein said finely divided solid particulate materials are selected from the group consisting of primary, secondary and minor element plant nutrient particles, micronutrient particles, pesticide particles and mixture thereof.

17. The fertilizer composition of claim 11 wherein said granules formed are N-P-K fertilizers.

* * * * *